C. H. LA FRANCE.
POWER HOISTING APPARATUS.
APPLICATION FILED AUG. 3, 1914.
1,161,229.
Patented Nov. 23, 1915.
2 SHEETS—SHEET 1.
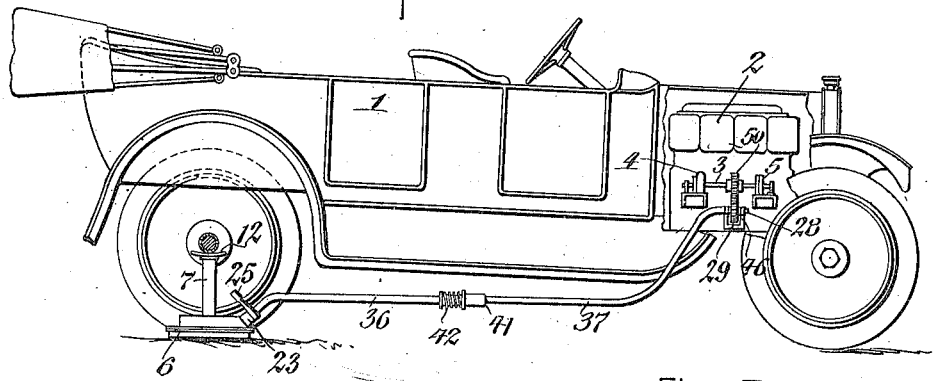
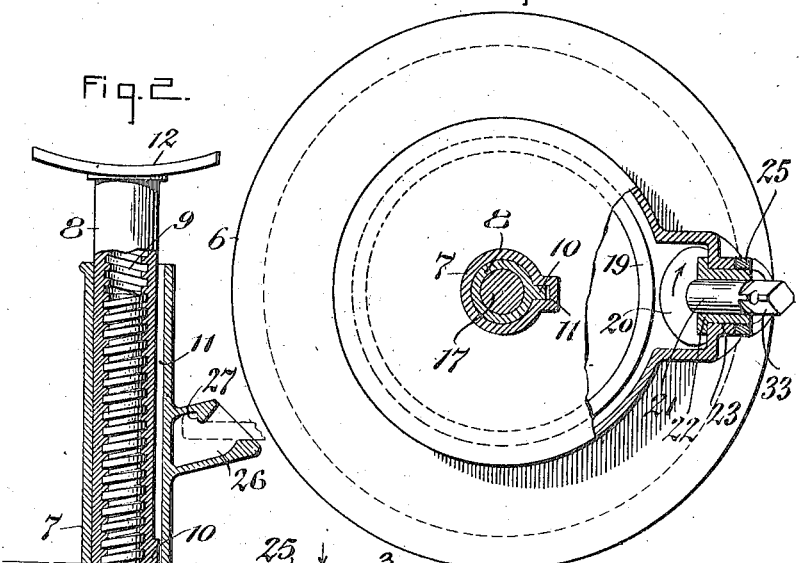
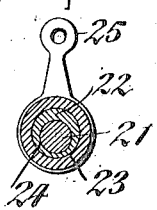
WITNESSES
W. Ray Taylor
Julius J. Prible
INVENTOR
Charles H. La France
by Geyer & Popp
ATTORNEYS

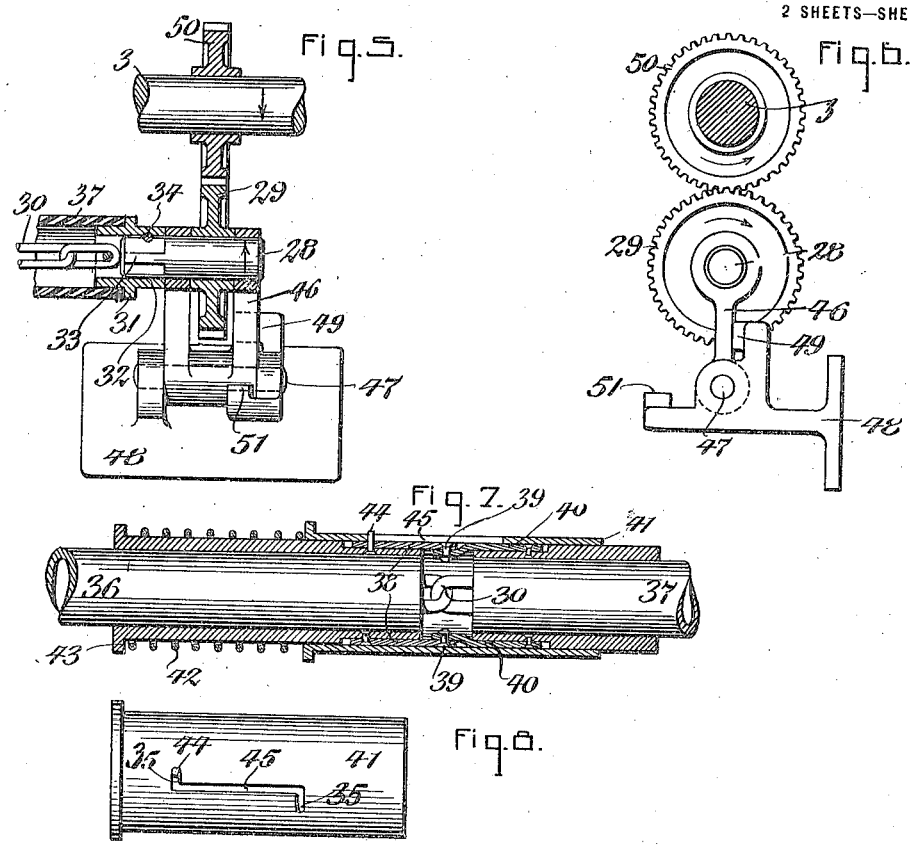

UNITED STATES PATENT OFFICE.

CHARLES H. LA FRANCE, OF BUFFALO, NEW YORK.

POWER HOISTING APPARATUS.

1,161,229.  Specification of Letters Patent.  Patented Nov. 23, 1915.

Application filed August 3, 1914. Serial No. 854,891.

*To all whom it may concern:*

Be it known that I, CHARLES H. LA FRANCE, a citizen of the United States, residing at Buffalo, in the county of Erie and State of New York, have invented new and useful Improvements in Power Hoisting Apparatus, of which the following is a specification.

This invention relates to a power hoisting apparatus which is more particularly designed for raising and lowering an automobile or motor vehicle when this is necessary for adjustment, inspection or repairs of any of its parts.

It is the object of this invention to provide a power hoisting apparatus for this purpose which derives its power from the motor or other source of energy which is mounted on the automobile and ordinarily used for other purposes such as driving the motor car, illuminating the lamps or the like, thereby permitting the motor vehicle to be raised and lowered when required without any manual labor or undue physical exertion on the part of the driver or attendant and enabling the car to be taken care of more easily and conveniently than when the same is raised and lowered manually.

In the accompanying drawings: Figure 1 is a side elevation, partly in section, of a motor car or vehicle equipped with one form of my improved power hoisting apparatus. Fig. 2 is a vertical section, on an enlarged scale, showing one form of lifting jack which may be employed as a part of my improved power hoisting apparatus. Fig. 3 is a horizontal section taken in line 3—3, Fig. 2. Fig. 4 is a section taken in line 4—4, Fig. 2. Fig. 5 is a fragmentary vertical longitudinal section, on an enlarged scale, showing the means of taking motion from the pump shaft of the automobile for operating the hoisting apparatus. Fig. 6 is an end elevation of the same, partly in section. Fig. 7 is a fragmentary longitudinal section of a portion of the flexible shaft whereby motion is transmitted from the motor of the automobile to the lifting jack. Fig. 8 is a side elevation of the retaining sleeve whereby the sections of the casing of the flexible shaft are held in alinement relatively to each other.

Similar characters of reference indicate corresponding parts throughout the several views.

1 represents an automobile or motor vehicle which may be operated by a prime mover of any suitable kind. As illustrative of the various kinds of motors which may be employed for this purpose that shown in Fig. 1 is a gas engine or explosion motor 2 which is mounted on the front part of the car and operatively connected with the driving wheels of the car in any suitable and well known manner. The power developed by this engine is utilized for operating the lifting jack whereby the motor vehicle may be raised and lowered. For this purpose the lifting jack is operatively connected with any suitable shaft which is mounted on the car and receives its power from the engine on the car. In the example illustrated in Figs. 1, 5 and 6 as showing one of the various means of transmitting motion from the motor to the lifting jack the driving shaft 3 which operates the water pump 4 and the magneto 5 has been selected for this purpose. This driving shaft 3 is arranged horizontally and lengthwise on one side of the prime mover or engine of the motor car and is operatively connected with the engine shaft so as to derive its power from the engine in any suitable and well known manner. The lifting jack which is operated from this shaft 3 may also be constructed in various ways that shown in Figs. 1, 2, 3 and 4 being illustrative of one form and constructed as follows: The main frame of the lifting jack is preferably constructed in the form of a standard having a hollow circular base or foot 6 which is adapted to rest on the ground, floor or other suitable support and which is provided centrally on its upper side with an upwardly projecting tubular post or column 7. Sliding vertically in the column is a vertical tubular shank or sleeve 8 which is provided with an internal screw thread 9 so that the same practically forms a screw nut. Turning of this shank in the column is prevented by means of a spline or feather 10 arranged lengthwise on its exterior and engaging with a groove 11 in the bore of the column, which connection however permits the shank to move freely up and down in the column. At its upper end the shank is provided with a lifting member or saddle 12 which is adapted to engage with the underside of the axle or other part of an automobile for the purpose of raising or lowering the same.

Within the lower part or base of the standard is arranged a rotatable driven or operating wheel 13 which may be journaled in any suitable manner so that this wheel turns about a vertical axis, the means for this purpose shown in the drawings consisting of a ball bearing 14 interposed between a recess 15 formed centrally on the underside of the operating wheel and a recess 16 formed centrally on the upper side of the bottom of the base, as shown in Fig. 2. Projecting upwardly from the center of the operating wheel is a lifting screw or screw shaft 17 the external thread of which engages with the internal thread of the shank 8, whereby upon turning the operating wheel and lifting screw the lifting member will be raised or lowered together with the part resting thereon. Although various means may be provided for turning the operating wheel in one direction or the other, the means for this purpose which are shown in Figs. 2 and 3 are suitable, and comprise a radial flange 18 formed on the peripheral portion of the operating wheel and provided on its upper side with a frictional driving surface which is arranged radially relatively to the axis of this wheel or in a plane at right angles thereto, and a cylindrical flange 19 projecting upwardly from the operating wheel and having a cylindrical driving surface on its peripheral or outer side which is concentric with the axis of said wheel. Between the driving faces of the radial and cylindrical flanges of the operating wheel is arranged a conical friction driving pinion 20 the axis of which is arranged oblique and preferably at an angle of 45 degrees relatively to the faces of the radial and cylindrical flanges of the operating wheel. By this means it is possible to engage the friction pinion either on its underside with the radial flange of the operating wheel for rotating the same in one direction or the upper part of this friction pinion may be engaged with the cylindrical flange of the operating wheel for turning the latter in the opposite direction. The diameter of the friction face on the radial flange is greater than the diameter of the friction face of the cylindrical flange so that the leverage during engagement of the friction pinion with the radial flange is greater than when this pinion engages with the cylindrical flange. The trend of the screw threaded connection between the screw shaft and the shank is therefore so determined that when the friction pinion engages with the radial flange of the operating wheel the screw shaft will operate to raise the shank and lifting member easily inasmuch as the greatest power is at this time required for lifting the load, while less power is required for turning the operating wheel in the opposite direction for lowering the load so that ample leverage at this time is obtained by engaging the friction pinion with the cylindrical flange of the operating wheel. This friction pinion is mounted on a pinion driving shaft 21 which is so mounted that the same may be raised or lowered for moving either the lower side of the pinion into engagement with the radial flange or the upper side thereof into engagement with the cylindrical flange. The preferred means for this purpose comprise a rotatable bearing sleeve 22 which is journaled in an oblique bearing 23 formed on the upper part of the hollow base and provided with a bearing 24 extending eccentrically through the same for the reception of the pinion shaft 21. Owing to this eccentric support of the pinion shaft the bearing sleeve when turned so that its eccentric bearing is lowered will bring the friction pinion into engagement with the radial flange and cause the lifting member to be raised while upon turning the bearing sleeve so that the eccentric bearing thereof is raised the pinion will be engaged with the cylindrical flange and cause the lifting member to be lowered, but when the bearing sleeve is so turned that its eccentric bearing is midway between its upper and lowermost positions, the friction pinion will be out of engagement with the cylindrical flange and the radial flange, so that no motion will be transmitted from the friction pinion to the operating wheel even though the pinion continues to rotate in the same direction. The pinion is preferably left in the last mentioned position when the lifting member has been raised to the desired position or when the lifting jack is not in use. The turning of the eccentric bearing sleeve may be effected in any suitable manner, for instance, by means of a handle or lever 25 which is secured to the outer end of the bearing sleeve, as shown in Fig. 2, so that the same is within convenient reach of the operator.

For convenience in pushing the lifting jack into and out of its position underneath the automobile axle or other part which is to be engaged, the upper part of the post or column of the standard is provided with a laterally projecting socket 26 having its upper part provided with a downwardly projecting shoulder 27, so that a tool having an upwardly projecting hook may be inserted into this socket and engaged with this shoulder for shifting the lifting jack easily into the desired position.

The means shown in the drawings for transmitting motion from the counter driving shaft 3 of the vehicle motor to the friction pinion shaft 21 of the lifting jack may be variously designed, but that shown in the drawings comprises a counter shaft 28 provided with a gear wheel 29 meshing with the gear wheel 50 on the driving shaft 3, as shown in Figs. 1, 5 and 6, and a flexible shaft connecting the counter shaft 28 with the pinion shaft 21. This flexible shaft may be of any usual and well known type but that shown in the drawings comprises a flexible driving core 30 having preferably the form of a chain, coupling sleeves 31 arranged at opposite ends of the core and having flat sided sockets 32 which engage with correspondingly shaped shanks 33 on the attaching ends of the counter shaft 28 and the pinion shaft 21 so as to obtain a driving connection between the shafts 28, 21 and the core of the flexible shaft. These coupling sleeves are preferably detachably connected with their respective shafts by means of transverse spring keys or pins 34 passing crosswise through corresponding recesses or notches in the coupling sleeves and the respective attaching ends of the driving and driven shafts 21, 28. The core of the flexible shaft is inclosed by a casing which in this instance preferably comprises two sections 36, 37 terminating at their inner ends about half way of the length of this shaft while their outer ends are secured respectively to the coupling sleeves 31. At the inner ends of the casing sections the latter may be either folded relatively to each other together with the core of the shaft so as to permit of stowing the lifting apparatus away more compactly or the opposing ends of the casing sections may be held in line with each other when it is desired to put the flexible shaft in operative condition for driving the lifting jack. The preferred means for thus permitting the flexible shaft to be either doubled or retained in its straightened or normal position which are shown in Figs. 1, 7 and 8 are constructed as follows: 38 represents a pair of pivot ears arranged on the inner end of one of the casing sections and pivotally connected by means of transverse rivets 39 or the like with a similar pair of pivot ears 40 arranged on the opposing inner end of the other casing section so that these two casing sections may be folded or unfolded relatively to each other. 41 represents a retaining sleeve mounted on the inner end of one of the casing sections, for instance 36, and capable of being moved lengthwise thereon so as to engage or embrace the opposing inner end of the other casing section 37 and cross the joint between the same for holding the same rigidly in alinement with each other and enabling the flexible shaft core to work freely therein. The retaining sleeve is preferably held yieldingly in its operative position by means of a spring 42 surrounding the inner end of the casing section 36 and bearing at one end against the retaining sleeve and at its other end against a shoulder 43 on the adjacent casing section. The retaining sleeve is limited in its longitudinal movement by means of a stop pin 44 arranged on the same casing section which carries the spring 42 and engages with the longitudinal part or runway 45 of a slot formed in the adjacent part of the retaining sleeve so that opposite ends of this slot upon engaging with the stop pin 44 serve as means for limiting the longitudinal movement of the retaining sleeve. The latter may be also locked in either its operative or inoperative position by means of locking notches, shoulders or branch slots 35 formed transversely in the retaining sleeve at opposite ends of the longitudinal runway. By means of these notches it is only necessary to give the retaining sleeve a slight turn when the locking pin is arranged at either end of the runway in order to engage the locking pin with the respective locking notch and thereby hold the retaining sleeve against longitudinal movement on the flexible shaft casing while the parts are in this relative position.

Means are provided for moving the driven gear wheel 29 either into or out of engagement with the driving gear wheel 50 of the shaft 3 so that the lifting jack may be driven when necessary but unnecessary wear of the parts at other times may be avoided. For this purpose the counter shaft 28 is mounted in a movable support which preferably consists of a vertically swinging rock arm 46 provided at its upper end with bearings in which the counter shaft is journaled and pivoted at its lower end by means of a horizontal longitudinal pin 47 on a bracket 48 projecting laterally from the base of the engine. When the rock arm 46 is turned into an upright position the gear wheel of the counter shaft is in mesh with the gear wheel of the driving shaft 3, as shown in Figs. 1, 5 and 6, this upward swinging movement being limited by means of a stop 49 arranged on the bracket 48 in position to be engaged by said rock arm. The direction of this upward swinging movement of the rock arm 46 is preferably so determined that it coincides with the direction in which the operative part of the driving gear wheel 50 engages with the driven gear wheel 29 on the counter shaft so that the driving pressure of the gear wheel 50 against the driven gear wheel 29 operates constantly to hold the rock arm 46 against the stop 49 without requiring any further means for this purpose. When it is desired to operatively disconnect the driving shaft 3 from the counter shaft 28 it is only necessary to swing the rock arm 46 outwardly and downwardly sufficiently to disengage the driven gear wheel from the driving gear wheel. The disengaging movement of this rock arm is preferably limited by means of a stop 51 arranged on the bracket 48 in position to be engaged by the rock arm 46.

This improved power hoisting apparatus can be placed in position and easily operated without personal contact with any greasy or dirty parts of the vehicle and no physical effort is required either to raise or lower the load imposed upon the lifting jack.

Inasmuch as this hoisting device can be applied to any part of the car which is usually engaged by a lifting jack no effort is required on the part of the attendant to raise or lower the car inasmuch as the power for its operation is derived from the power plant of the car itself and inaccessible or awkward places underneath the car can therefore be reached as easily by this hoisting device as places which are more accessible or within convenient reach.

Owing to the fact that the power for operating this hoisting device is derived from the prime mover of the car the operation of raising and lowering the car may be effected in much less time than that ordinarily required when a hand operated lifting jack is used and there is also less liability of accidents as well as greater safety for the operator. Furthermore, the simplicity of the construction of this hoisting apparatus renders the same less liable to get out of order and capable of being produced at comparatively low cost.

Although the forms or embodiments of this invention which are shown in the drawings are practical and answer the purpose it is obvious that the same may be altered in various respects without departing from the essential features of this invention.

I claim as my invention.

1. The combination of a motor vehicle having a power driven shaft and a hoisting device comprising a lifting member adapted to engage the part to be elevated, and means for transmitting power from said shaft to said lifting member comprising a flexible shaft connected with said power driven shaft, said flexible shaft having a casing which is constructed in sections and said sections having retaining means for permitting the same to be folded or held in alinement with each other.

2. The combination of a motor vehicle having a power driven shaft and a hoisting device comprising a lifting member adapted to engage the part to be elevated, and means for transmitting power from said shaft to said lifting member comprising a flexible shaft connected with said power driven shaft, said flexible shaft having a casing which is constructed in sections and said sections having retaining means for permitting the same to be folded or held in alinement with each other, said retaining means comprising pivotally connected ears arranged on the opposing ends of said casing sections, and a sleeve movable lengthwise of said casing sections across the joint between the same.

3. The combination of a motor vehicle having a power driven shaft and a hoisting device comprising a lifting member adapted to engage the part to be elevated, and means for transmitting power from said shaft to said lifting member comprising a flexible shaft connected with said power driven shaft, said flexible shaft having a casing which is constructed in sections and said sections having retaining means for permitting the same to be folded or held in alinement with each other, said retaining means comprising pivotally connected ears arranged on the opposing ends of said casing sections, a sleeve movable lengthwise of said casing sections across the joint between the same, a spring interposed between said sleeve and a shoulder on one of said casing sections, and a locking pin arranged on one of said casing sections and engaging with a slot formed in said sleeve and having a longitudinal runway and transverse shoulders at opposite ends of said longitudinal runway.

4. A hoisting device comprising a standard, a lifting member guided to move vertically on said standard, and means for moving said lifting device vertically comprising a rotatable wheel operatively connected with said lifting member and having two annular driving flanges arranged at an angle to one another, a driving pinion arranged between said flanges, and means movably supporting said pinion on said standard and adapted to shift said pinion into engagement with either one or the other of said flanges.

5. A hoisting device comprising a standard, a lifting member guided to move vertically on said standard, and means for moving said lifting device vertically comprising a rotatable wheel operatively connected with said lifting member and having two annular driving flanges, a driving pinion arranged between said flanges, a sleeve journaled in a bearing on the standard and having an eccentric bearing, a driving shaft journaled in said eccentric bearing and carrying said pinion, and means for turning said sleeve for engaging said pinion with either one or the other of said flanges.

6. A hoisting device comprising a standard, a lifting member guided to move vertically on said standard, and means for moving said lifting device vertically comprising a rotatable wheel operatively connected with said lifting member and having two annular driving flanges, one of which has a radial face and the other a cylindrical face, a conical friction driving pinion arranged between the faces of said flanges, and means for moving said pinion into engagement with either of said faces.

7. A hoisting device comprising a lifting member, and means for operating said lifting member comprising a driving shaft, a driving gear wheel arranged on the driving shaft, a driven shaft, a driven gear wheel mounted on the driven shaft, a rocking support for said driven shaft capable of moving said gear wheels into and out of engagement, and stops for limiting the rocking movement of said support only in the direction of the pressure of the driving gear wheels against the driven gear wheel.

Witness my hand this 1st day of August, 1914.

CHARLES H. LA FRANCE.

Witnesses:
 CHAS. S. ASH,
 WM. A. RIDGE.

Copies of this patent may be obtained for five cents each, by addressing the "Commissioner of Patents, Washington, D. C."